Nov. 26, 1940.  B. MAYEROVITZ  2,223,219

CAMERA CASE

Filed Dec. 14, 1938   2 Sheets-Sheet 1

INVENTOR
Bernat Mayerovitz
BY
ATTORNEY

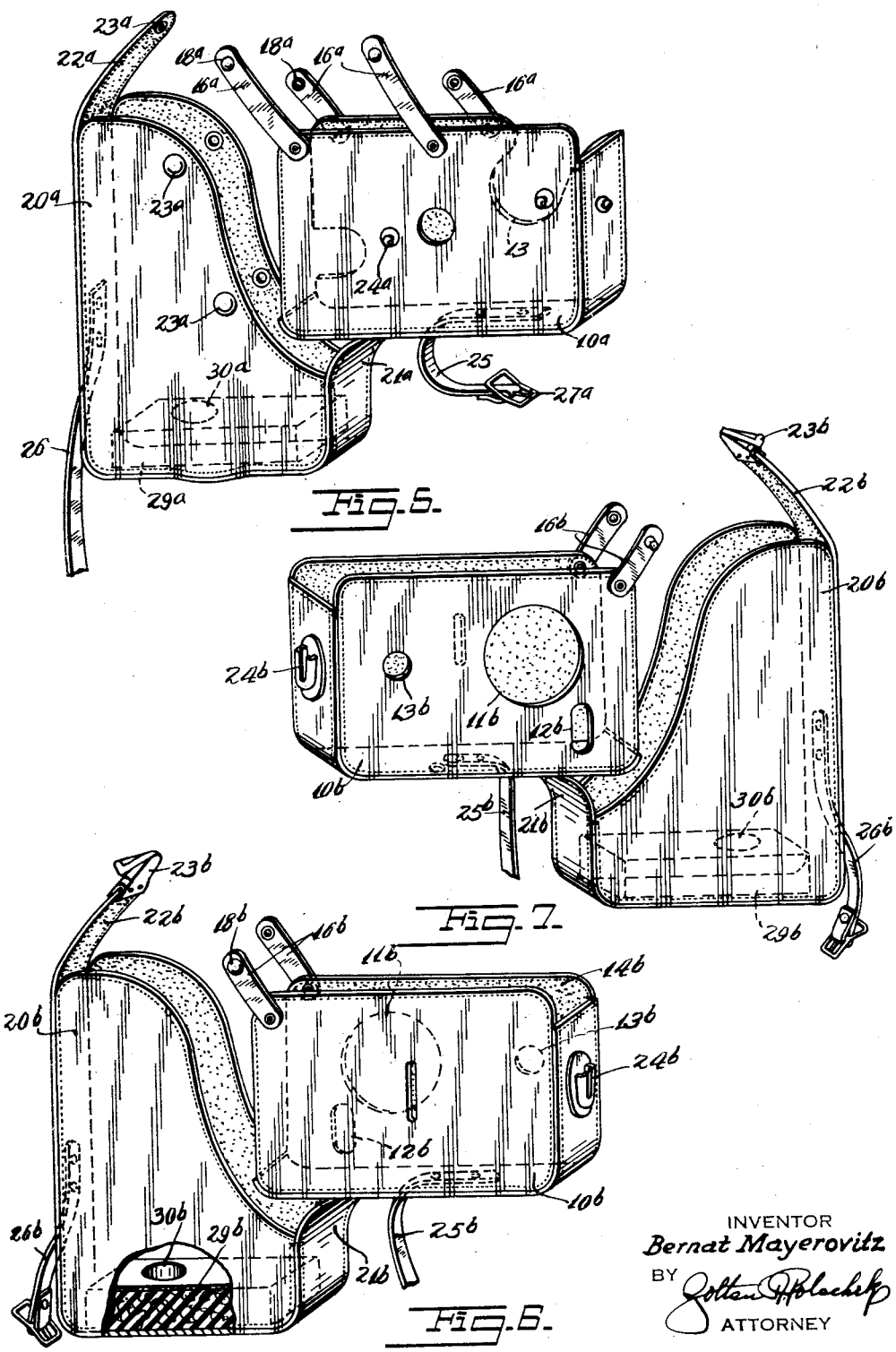

Patented Nov. 26, 1940

2,223,219

UNITED STATES PATENT OFFICE 2,223,219

CAMERA CASE

Bernat Mayerovitz, New York, N. Y.

Application December 14, 1938, Serial No. 245,677

1 Claim. (Cl. 95—31)

This invention relates to new and useful improvements in a camera case.

The invention has for an object the construction of a camera case which is characterized by a case section adapted to be fixedly mounted on a camera and having cutouts for exposing all parts of the camera which must be used when making a picture, and flexibly or foldably connected with an outer case section to cover up all the exposed portions of the camera at certain times.

The invention proposes to so arrange the case sections that they may easily be unfolded to expose the camera for use.

The invention proposes to provide a flexible connecting arrangement between the case sections which permits them to be readily folded together or separated conveniently as required.

Still further it is proposed to provide a means for releasably holding the case sections in their folded positions.

Another one of the objects of this invention is to arrange a strap for supporting the same camera case, of two sections, one attached to each of the case sections and located at positions to facilitate the unfolding of the sections when required.

Still further the invention contemplates the use of shock absorbing material mounted on one of the case sections at an area where the camera strikes when the case sections are folded together, to protect the camera from undue shocks.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 5 is a perspective view of Fig. 4 looking from the rear.

Fig. 6 is a perspective view of another camera case, a modified form, embodying the features of this invention.

Fig. 7 is a perspective view looking from the rear side of Fig. 6.

The camera case, according to this invention, includes a case section 10 adapted to be fixedly mounted on a camera and having a plurality of cutouts 11, 12, 13, 14 and 15 for exposing the parts of the camera which must be used when a picture is taken. The particular cutouts in the case section vary with different types and sizes of cameras. The case section is fashioned to snugly and neatly encase the camera. A means is provided for releasably holding the camera in position, and in this particular case, consists of a pair of straps 16, 17 attached at one of their ends on opposite sides of the case section and at their adjacent ends being provided with snap fasteners 18 to engage each other when the straps are extended towards each other.

Figure 1:
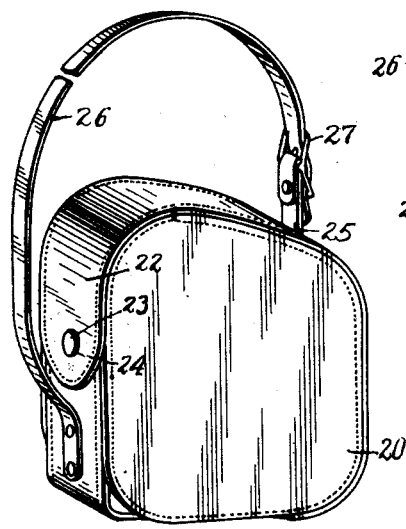
Fig. 1 is a perspective view of camera case constructed according to this invention and illustrated in the folded condition.
Figure 2:
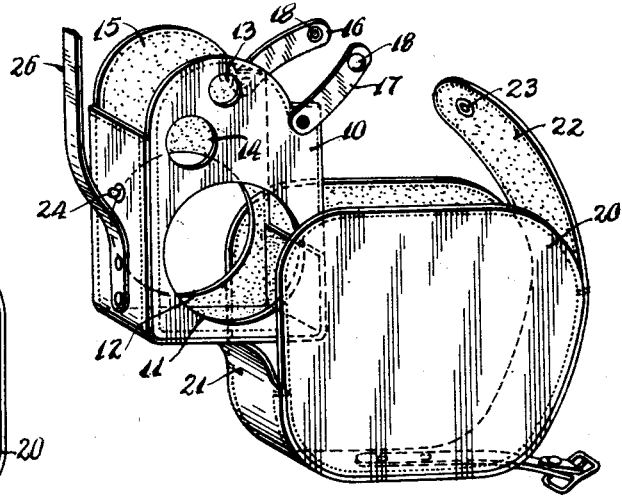
Fig. 2 is a perspective view of the case shown in Fig. 1 with the case sections unfolded.
Figure 3:
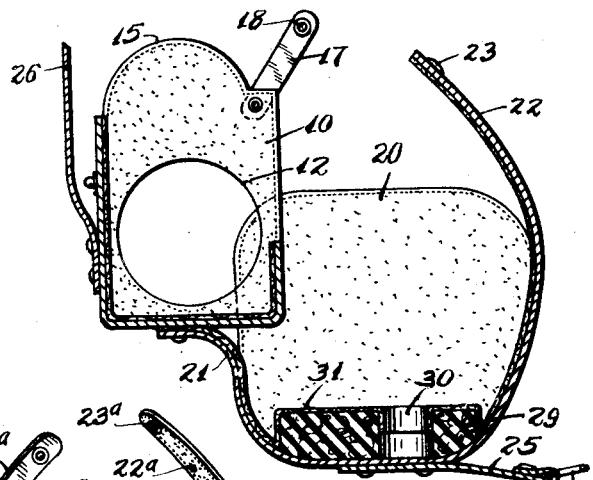
Fig. 3 is a transverse vertical sectional view of Fig. 2.

The case section 10 is used in conjunction with an outer case section 20. This outer case section is adapted to engage over and cover all cutout portions of the inner case section 10 which expose portions of the camera. The case section 20 is flexibly connected with the case section 10 by a flexible strip of material 21 in a manner so that the case sections may be folded together or separated. In Fig. 1 the sections are in their folded positions, while Figs. 2 and 3 illustrate them separately. A means is provided for releasably holding the case sections together in their folded positions. This means includes a strip portion 22 upon the case section 10 and provided with a fastening element 23 cooperative with a complementary fastening element 24 mounted upon the case section 10. In Fig. 1 these fastening elements are shown engaging each other.

A strap is provided for supporting the camera case and consists of two sections, a short section 25 and a long section 26. The section 25 is attached at one of its ends upon the case section 20. At its other end it is provided with a buckle 27. The other strap section 26 is attached at one of its ends on the case section 10 and its other end is adapted to cooperate with the buckle 27 for joining the free ends of the section together. This permits the camera case to be worn similar to a sling over one's shoulder. The strap sections 25 and 26 are arranged in line with the strip 21 so that the sections may be relatively pulled to unfold the case section 10 and 20.

Shock absorbing material is mounted on one of the sections at an area where the camera strikes when the sections are closed. This shock absorbing material consists of a piece of sponge rubber material 29. This rubber material is formed with an opening 30 to receive a projecting portion of the camera for which the case is intended. For different cameras it is required that the opening 30 be of different sizes and at different locations. The pad 29 is covered with velvet material 31.

The operation of the device is as follows:

When the camera is not used the case is in its folded condition as shown in Fig. 1. To use the camera it is merely necessary to disengage the fastening elements 23 and 24. It is then possible to pull upon the strap sections 25 and 26 to unfold the camera case to the position illustrated in Fig. 2. In this position the case 10 is fully open and the camera may be used to take pictures as required.

Figure 4:
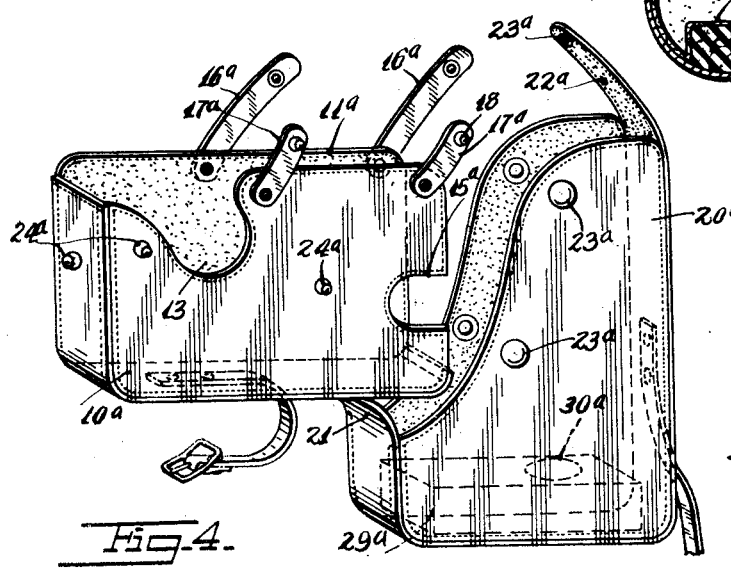
Fig. 4 is a perspective view of another camera case constructed according to another embodiment of this invention and illustrated in the unfolded condition and embodying the features of this invention.

In Figs. 4 and 5 another case is illustrated for a different type and size of camera, but embodying the identical features of this invention. According to this form of the invention there is a case section 10ª adapted to be fixedly mounted on the camera and having cutouts 11ª, 12ª, 13ª, etc., for exposing all parts of the camera which must be used when taking a picture. An outer case 20ª is provided for engaging over the case 10ª and this outer case is adapted to cover over all of the cutouts which expose portions of the camera. A means is provided for flexibly connecting the case sections 10ª and 20ª so that they may be folded together and separated as required. This means includes a flexible strip portion 21ª joining the casing sections together.

A means is provided for releasably holding the case sections in folded position and this means includes fastening elements 23ª mounted upon the case section 20 and cooperative with complementary fastening elements 24ª mounted on the case section 10ª. Straps 16ª and 17ª are mounted upon the case section 10ª and are provided with fastening elements 18ª cooperative with each other for releasably securing the camera within the case section 10ª. The case section 20ª is also provided with a strip portion 22ª having a fastening element 23ª cooperative with a fastening element 24ª on the case section 10ª for assisting in holding the case sections in their folded positions.

A strap is also provided for supporting the camera case and this strap consists of two sections, a short section 25ª attached upon one of the case sections at one of its ends and at its other end being provided with a buckle 27ª, and a long strap section 26ª attached at one of its ends on the other case section and cooperative with the buckle 27ª for forming a sling for carrying the camera. The strap sections 25ª and 26ª are arranged in line with the flexible strip connection 21ª to facilitate unfolding of the camera case sections.

Shock absorbing material is also mounted on one of the case sections at an area where the camera strikes when the case sections are folded and this material includes a resilient pad 29ª mounted upon the case section 20ª and formed with an opening 30 for receiving a projecting portion of the camera. In other respects this form of the invention is similar to the preferred form.

In Figs. 6 and 7 a still further embodiment of this invention has been disclosed which distinguishes from the prior form in the fact that the camera case is adapted to engage another type of camera. According to this form of the invention there is a case section 10ᵇ adapted to be fixedly mounted on a camera and having cutouts 11ᵇ, 12ᵇ, 13b, 14ᵇ, etc., for exposing all parts of the camera which must be used when taking a picture. Straps 16ᵇ are mounted at one of their ends upon portions of the case section 10ᵇ and at their other ends are provided with coacting fastening elements 18ª which may be engaged to securely hold the camera within the case section. The case section 10ᵇ is connected by a flexible strip of material 21ᵇ to an outer case section 20ᵇ. This outer case section is adapted, when folded upon the case section 10ᵇ, to cover all exposed portions of the camera which are exposed through the various cutouts in the section 10ᵇ.

The case section 20ᵇ is provided with a strip 22ᵇ having a fastening element 23ᵇ cooperative with a complementary fastening element 24ᵇ on the casing section 10ᵇ to assist in holding the case sections in their folded positions. A strap 25ᵇ is mounted on one of the casing sections and has a buckle 27ᵇ cooperative with a strap 26ᵇ mounted on the other casing section. The camera case may be supported from one's shoulder by these strap sections. Shock absorbing material 29ᵇ is mounted on one of the case sections at an area where the camera strikes when the case sections are folded. This shock absorbing material is provided with an opening 30ᵇ adapted to receive a projecting portion of the camera. In other respects this form of the invention is similar to the preferred forms.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

A case for cameras or the like comprising an inner case section including a front, a rear, and at least one side wall member, cut-out means in said inner case section for exposing the elements of a camera mounted in said section for picture taking, fastening means for removably holding a camera in said section, an outer case section substantially enclosing said inner case section, said outer case section having at least a portion of a side wall thereof cut-away, and hinge means on the side wall of said outer case section adjacent said cut-away portion connecting said sections to allow said outer case section to be pivoted laterally relative to said inner case section whereby to expose said inner case section for picture taking, said case having a carrying strap attached thereto, one end of said strap being anchored to a side wall of said inner case section, the other end of said strap being anchored to a side wall of said outer case section whereby, when said sections have been pivoted to expose said inner case section, pulling of said strap pivots said section closed.

BERNAT MAYEROVITZ.